Oct. 12, 1937.  L. E. LA BRIE  2,095,753
BRAKE
Filed Dec. 18, 1931  2 Sheets-Sheet 1
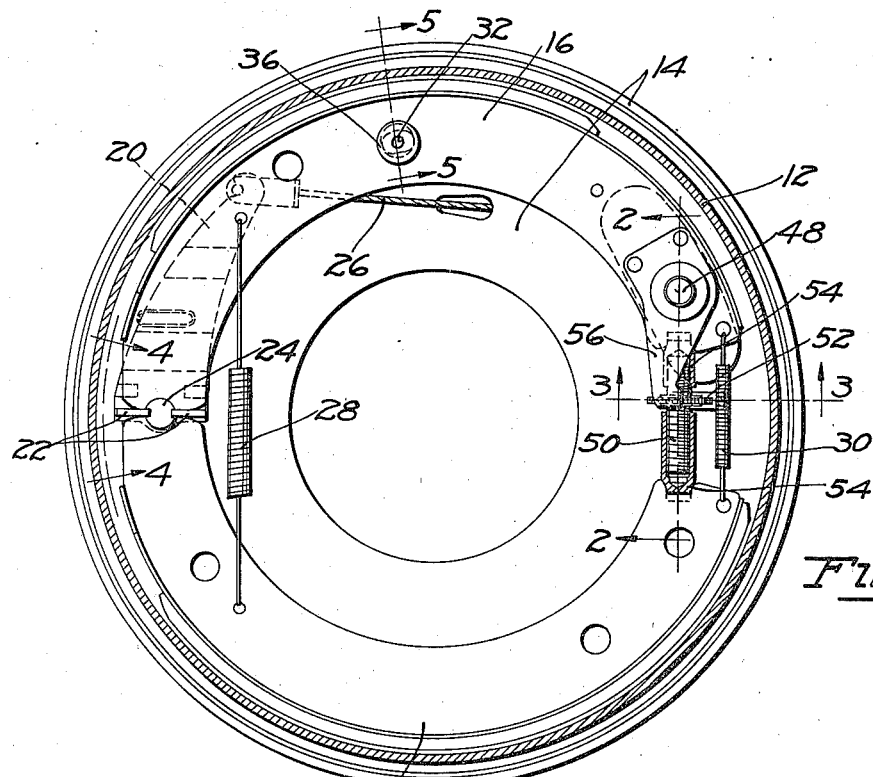
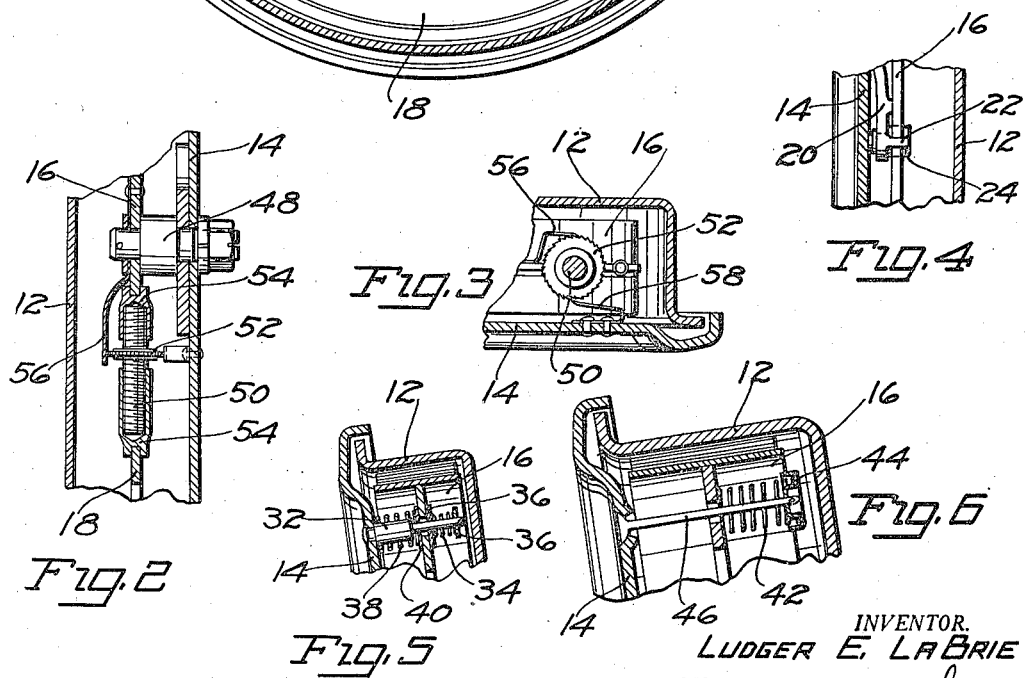
INVENTOR.
LUDGER E. LaBRIE
BY
ATTORNEY Oct. 12, 1937.    L. E. LA BRIE    2,095,753
BRAKE
Filed Dec. 18, 1931    2 Sheets-Sheet 2

INVENTOR.
LUDGER E. LABRIE
BY
ATTORNEY

Patented Oct. 12, 1937

2,095,753

UNITED STATES PATENT OFFICE 2,095,753

BRAKE

Ludger E. La Brie, South Bend, Ind., assignor to Bendix Aviation Corporation, South Bend, Ind., a corporation of Delaware Application December 18, 1931, Serial No. 581,967

16 Claims. (Cl. 188—78)

This invention relates to brakes, and is illustrated as embodied in an internal expanding brake for an automobile.

An object of the invention is to provide a novel connection, preferably adjustable and shown as a right-and-left threaded thrust device, between a floating brake shoe or its equivalent and another such shoe mounted on a fixed anchor. This has a substantial self-energizing effect on the unanchored shoe, giving a partial servo or self-applying action in the brake, without involving any considerable compounding of this action which might bring in the multiplication of undesired variations in braking effect, thereby giving a brake which (although suitable for use generally) is especially well adapted for application by power.

Another feature relates to the provision of novel automatic adjusting means, for example a part rigid with one of the shoes and shifted by excessive movement thereof to turn the above-described threaded connection to adjust the brake.

Other objects and features of the invention, including an improved steady rest and novel lining-attaching means, and other novel combinations of parts and desirable particular constructions, will be apparent from the following description of the illustrative embodiment shown in the accompanying drawings, in which:

Figure 1 is a vertical section through the brake, just inside the head of the brake drum, showing the brake shoes in side elevation;

Figure 2 is a partial section on the line 2—2 of Figure 1, showing the novel wear-adjusting connection;

Figure 3 is a partial section on the line 3—3 of Figure 1, showing the details of construction of the connection;

Figure 4 is a partial section on the line 4—4 of Figure 1, showing part of the applying means;

Figure 5 is a partial radial section on the line 5—5 of Figure 1, showing a steady rest;

Figure 6 is a section corresponding to Figure 5, and showing a modification of the steady rest;

Figure 7:
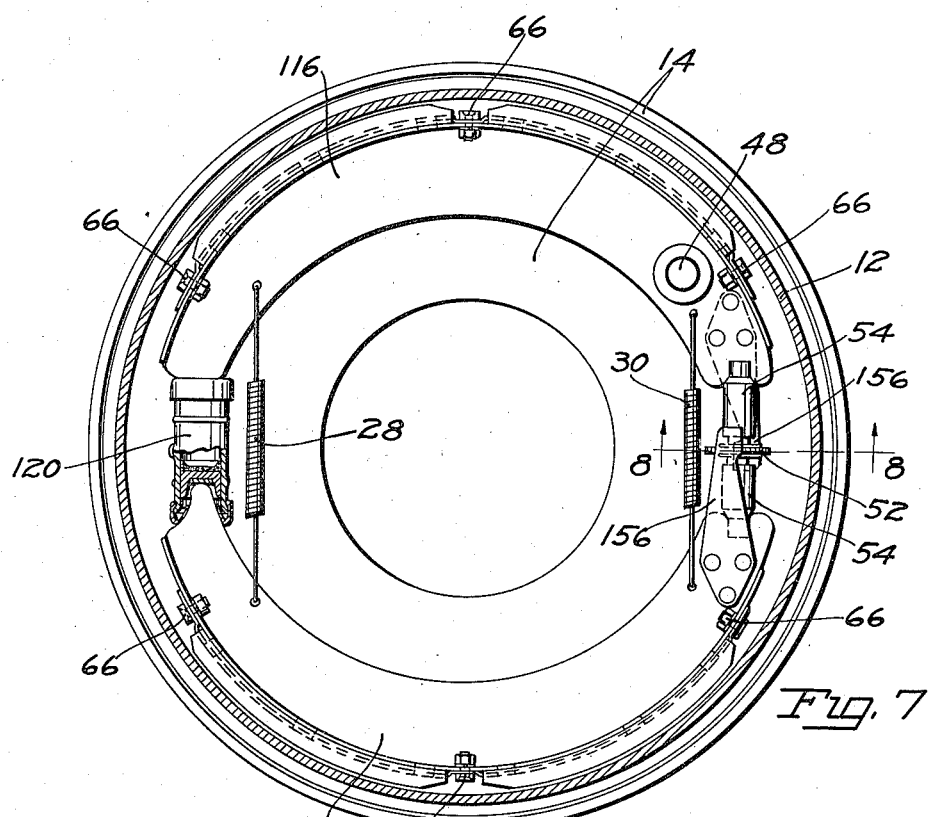
Figure 7 is a section corresponding to Figure 1, but showing hydraulic applying means for the brake, and also showing novel lining-attaching means.
Figure 8:
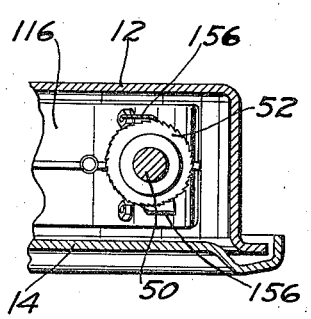
Figure 9:
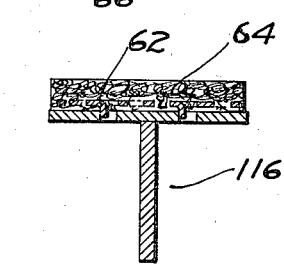
Figure 10:
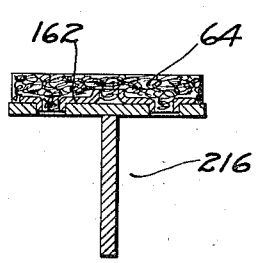
Figure 11:
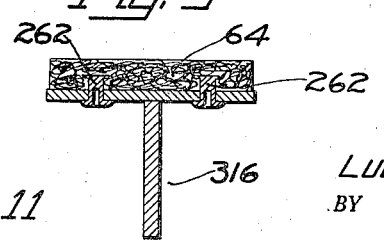

Figure 8 is a section through the adjusting and connecting means of Figure 7, on the line 8—8 of Figure 7, this means being somewhat different from that shown in Figures 1 and 3; and Figures 9, 10, and 11 are sections through shoes having different forms of lining-attaching means.

The brake illustrated in Figure 1 comprises a rotatable brake drum 12, at the open side of which is a backing plate 14, and within which is arranged the friction means. The illustrated friction means includes a pair of members such as shoes 16 and 18.

The brake in this figure is shown applied by means such as a novel floating lever 20 having thrust lugs 22 between the shoe ends and acting against the respective shoes, and having a cylindrical spacer lug 24 embraced between the shoes. The lever is operated by a tension element, such as a cable 26, passing through the backing plate and forming part of a Bowden type cable-and-conduit control.

The shoes may be connected by suitable return springs 28 and 30, and one shoe or both shoes may be provided with positioning means determining the released position of the shoes. The illustrated positioning means includes a post 32 riveted at one end to the backing plate and projecting through an opening in the web of the shoe. A spring 34 sleeved on the reduced-diameter end of this post is compressed between two washers 36, one engaging the side of the shoe web and the other held on the end of the post by means such as a conventional cotter pin. Another spring 38 sleeved on the other end of the post is compressed between the backing plate and a washer 40 engaging the side of the shoe web.

An alternative steady-rest construction is shown in Figure 6. In this construction there is a spring 42 compressed between the side of the shoe web and a stamping or washer 44 held by a cotter pin or the like on the end of a member 46 passing through an opening in the shoe web. Member 46 has a rounded head seated in a corresponding depression formed in the backing plate, thereby giving it ball-and-socket connection with the backing plate.

According to an important feature of the invention one of the shoes (e. g. shoe 16) is mounted on or arranged to anchor on a fixed post 48 carried by the backing plate. Post or anchor 48 is bolted to the backing plate in the manner shown in Figure 2 (i. e. by a nut clamping the plate against an enlarged collar on the anchor), and is arranged adjacent the end of the shoe opposite the applying device.

The other shoe (i. e. shoe 18) has at its corresponding end a connection, preferably adjustable, transmitting its braking torque to the anchored shoe immediately adjacent the anchor. The connection shown includes a right-and-left threaded member 50, having a central toothed operating part or disk 52, and having its ends threaded into corresponding sockets in caps or thrust parts 54 held by spring 30 seated in notches formed in the ends of shoes 16 and 18. This device is readily adjustable, by turning part 52, to compensate for wear of the brake.

I prefer to make this adjustment automatic, and desire at the same time to avoid the use of parts separate from the shoe assembly as necessitated in most automatic adjustments. To this end I provide preferably on shoe 16, a rigidly mounted arm or equivalent part 56, shown formed of spring steel and forming a pawl yieldingly engaging the teeth on part 52.

It will be seen that when the parts move more than a predetermined relative angular amount, due to wear of the brake lining, pawl 56 will snap over another tooth and will be operated during the release of the brake to turn part 52 an amount corresponding to one tooth to take up for wear. The connecting device 50—52 may be held against retrograde movement, as the pawl 56 snaps over a tooth in the described manner, by the friction of the parts (which at that time are under heavy pressure since the brake is applied), or if desired a spring or other type of holding pawl 58 (shown carried by the backing plate) may be provided to prevent such retrograde movement.

In the arrangement of Figure 7, there is a hydraulic applying device 120 for the shoes 116 and 118, and there is a spring pawl 156 on each of the two shoes. The two pawls engage teeth on opposite sides of part 52, and move in opposite directions to snap over the next pair of diametrically-opposite teeth in case of wear. If desired, they may be set half a tooth apart, giving the effect of having twice as many teeth on part 52.

In this arrangement, the rim of the shoe is shown formed with openings interlocking with projecting prongs forming part of a curved plate 62 imbedded in the lining 64 during the molding operation. The interlocking so provided prevents lengthwise movement of the lining on the shoe. Crosswise or separating movement is prevented by means such as bolts or other fastenings 66 securing the lining to the shoe rim.

In Figure 10 is shown a somewhat similar imbedded plate 162 having interlocking projections formed by punching out portions to form cylindrical hollow bosses. In Figure 11 the projections are provided by rivets 262 having head imbedded in the lining.

While illustrative embodiments have been described in detail, it is not my intention to limit the scope of the invention to those particular embodiments, or otherwise than by the terms of the appended claims.

I claim:

1. A brake comprising, in combination, a shoe mounted on a fixed anchor at one end and having an applying device at the other end, and another shoe connected at one end by an adjustable compression member to the first shoe, said member pivotally enaging said shoes respectively at its opposite ends, and said other shoe being acted on by said applying device at its other end.

2. A brake comprising, in combination, a shoe mounted on a fixed anchor at one end and having an applying device at the other end, another shoe connected at one end by an adjustable compression member to the anchored end of the first shoe and acted on by said applying device at its other end, and means operated by angular movement of the compression member for varying the length thereof to adjust the brake for wear.

3. A brake comprising, in combination, a shoe mounted on a fixed anchor at one end and having an applying device at the other end, another shoe connected at one end by an adjustable compression member to the anchored end of the first shoe and acted on by said applying device at its other end, and means operated by movement of the second shoe and said member for varying the length of said member to adjust the brake for wear.

4. A brake comprising an anchored shoe and a second shoe, an adjustable member connecting the second shoe to the anchored shoe, and a lever rigidly mounted on the anchored shoe for adjusting said member to compensate for wear of the brake.

5. A brake comprising a shoe anchored at one end and having applying means at the other end, a second shoe also applied by said means, an adjustable member connecting the second shoe to the anchored end of the first shoe, and automatic means for adjusting said member to compensate for wear of the brake.

6. A brake comprising a shoe having a fixed anchor adjacent one end and having an applying device adjacent its other end and having a part projecting past the anchor at said one end, a second shoe acted on by said applying device, and an adjustable thrust member connecting the second shoe to said projecting part of the first shoe and transmitting the braking torque of the second shoe through the first shoe to said anchor.

7. A brake comprising a shoe having a stiffening web and having an anchor adjacent one end, a second shoe having a stiffening web and having one end adjacent said anchor, and a thrust member connecting the second shoe to the first shoe and engaging the adjacent ends of the webs of the two shoes and transmitting the braking torque of the second shoe through the first shoe to said anchor.

8. A brake comprising a shoe having an anchor, a second shoe having one end adjacent said anchor, and a torque-transmitting member connecting said shoes and through which the second shoe transmits its braking torque to said first shoe adjacent said anchor and which is adjustable in effective length to compensate for wear of the brake and which engages the adjacent ends of the two shoes.

9. A brake comprising a friction member having rigid therewith an operating lever, a wear-adjusting device for the brake, and means for adjusting said device engaged and operated by said lever.

10. A brake comprising a pair of friction members one having rigid therewith an operating part, a wear-adjusting device connecting said members, and means for adjusting said device engaged and operated by said part.

11. A brake comprising movable friction means, a device for adjusting the brake for wear, and means operated by excessive movement of said friction means due to wear and effective when so moved to adjust said device to compensate for wear, both said device and said second means being mounted on and carried entirely by the friction means so that said two means and said device form a unitary subassembly independent of the rest of the brake.

12. A brake comprising movable friction means, a device for adjusting the brake for wear, and a lever member rigidly affixed to and carried by the friction means and engaging said device and operated by excessive movement of a part of said friction means due to wear and effective when so moved to adjust said device to compensate for wear.

13. A brake comprising a pair of shoes, an anchor for one end of one shoe, a right-and-left threaded connection between the other shoe and the anchored end of the anchored shoe, and a part carried by one shoe and rendered effective by movement thereof to turn said device to compensate for wear.

14. A brake comprising a pair of shoes, an anchor for one end of one shoe, and a right-and-left threaded connection between the other shoe and the anchored end of the anchored shoe.

15. A brake comprising a pair of shoes, an anchor for one end of one shoe, and a right-and-left threaded connection between the other shoe and the anchored end of the anchored shoe, together with a yieldingly-engaged means resisting turning of said device.

16. A brake comprising a pair of shoes, an anchor for one end of one shoe, and a right-and-left threaded connection between the other shoe and the anchored end of the anchored shoe, together with two yieldingly-engaged means, one mounted on one of the shoes and the other mounted independently of the shoes, and which are operated during the application and release of the brake to turn said connection to take up for substantial wear of the brake.

LUDGER E. LA BRIE.